US008348219B2

(12) United States Patent
Kelso et al.

(10) Patent No.: US 8,348,219 B2

(45) Date of Patent: Jan. 8, 2013

(54) INTEGRALLY FORMED MOTOR HOLDER

(75) Inventors: Jamie Kelso, Portland, OR (US); David Martenson, Oregon City, OR (US)

(73) Assignee: Xerox Corporation, Norwalk, CT (US)

( * ) Notice: Subject to any disclaimer, the term of this patent is extended or adjusted under 35 U.S.C. 154(b) by 758 days.

(21) Appl. No.: 12/424,864

(22) Filed: Apr. 16, 2009

(65) Prior Publication Data

US 2010/0264291 A1 Oct. 21, 2010

(51) Int. Cl.
*F16M 3/00* (2006.01)

(52) U.S. Cl. ........... 248/674; 248/678; 248/689; 310/90

(58) Field of Classification Search .................. 248/674, 248/678, 689, 500, 505, 346.03
See application file for complete search history.

(56) References Cited

U.S. PATENT DOCUMENTS 3,999,442 A * 12/1976 Decker et al. ................. 74/10 R
4,432,528 A 2/1984 Kretchman et al.
4,514,105 A * 4/1985 Adams et al. ................... 403/24
4,566,865 A * 1/1986 Nishitsuji et al. ............. 417/363
5,055,971 A * 10/1991 Fudala et al. ................. 361/760
5,102,090 A * 4/1992 Farris et al. ................... 248/674
5,355,678 A * 10/1994 Beitner ............................ 62/3.2
5,853,159 A * 12/1998 Gorini et al. .................. 248/674
6,279,866 B1 8/2001 Eilemann et al.
7,535,141 B2 * 5/2009 Ueno .............................. 310/90
7,960,882 B2 * 6/2011 Fukuzawa ....................... 310/90
2005/0174010 A1 * 8/2005 Porter et al. .................. 310/239
2006/0108885 A1 * 5/2006 Nishimura ....................... 310/90
2007/0035190 A1 * 2/2007 Ueno .............................. 310/90
2008/0238229 A1 * 10/2008 Iwashima et al. ............... 310/90

* cited by examiner

*Primary Examiner* — Nkeisha Smith

(74) *Attorney, Agent, or Firm* — Maginot, Moore & Beck, LLP

(57) ABSTRACT

A machine with a holder for mounting a motor to the device, which may be a printer, includes a support structure, a motor including a drive shaft with a drive shaft axis aligned with an opening in the support structure, and a holder including a base portion positioned adjacent to the motor, a first spring tab integrally formed with the base portion and operably contacting the motor to bias the motor toward the support structure, and a first latch arm integrally formed with the base portion and coupled with the support structure, the first latch arm resiliently deformed by the support structure in a direction away from the drive shaft axis.

8 Claims, 5 Drawing Sheets

INTEGRALLY FORMED MOTOR HOLDER

BACKGROUND

The system and method disclosed herein relates to a device for mounting a motor to a machine and more particularly to a printer with a device for mounting an electric motor to the printer.

A number of appliances and tools incorporate electric motors. A mounting structure is typically used to fix the motor to the device. The mounting structure used with a particular device maintains the motor drive shaft properly aligned with the components in the device which are driven by the motor. A gear provided on the motor drive shaft, for example, may be maintained in a coupled configuration with one or more gears to transfer the rotational energy produced by the motor to another component in the device.

The position at which the motor is mounted in a given system is a function of the purpose for which the motor is provided along with design constraints of the particular system. Accordingly, various motor mounting approaches have been incorporated in different systems depending upon the particular needs of the system. Wet/dry vacuum appliances, for example, often have a motor attached directly to the appliance lid via fasteners such as screws or bolts. Other motor mounting techniques include the use of rigid flanges and brackets which are bolted onto the motor and then permanently fastened to the frame and/or to the housing to which the motor is to be mounted.

Motor mounts which incorporate bolts, screws, and other fasteners are very effective. As the number of components needed to mount a motor to a device increases, however, increased inventory for the various parts must be maintained at the location where the system is assembled. Additionally, as the number of components needed for assembly of a motor to a device increases, the complexity of assembling the motor onto the device increases.

Moreover, design criteria in more complicated systems frequently dictate the positioning of motors in very tight spaces which are difficult to access even with a single hand. Thus, positioning a motor in the proper position and maintaining the motor in that position with one hand while positioning and affixing fasteners, flanges, etc. with a second hand can be very challenging and significantly increase the time needed to mount a motor to a device. As the time required for assembly increases, the cost of mounting a given motor increases.

Additionally, there are many instances wherein a motor must be removed. Motors may need to be removed to provide access to other components in need of service, or the motor itself may require service. Each time a motor is removed, the components used to fasten the motor to the device must be removed. The time required to remove the mounting components increases the down-time for the device. When working with small components, such as screws, bolts, and washers, particularly in locations which are difficult to access, components may be dropped, extending down-time while the components are retrieved. In more complex systems, finding and extracting a small component may result in an extended delay in the down-time for the system.

A printer is a complex system which incorporates a number of motors, some if which are very small. The word "printer" as used herein encompasses any apparatus, such as a digital copier, book marking machine, facsimile machine, multi-function machine, etc., which performs a print outputting function for any purpose. The motors in a particular printer may be positioned in difficult to access locations close to other sensitive printer components. Accordingly, efficient mounting and removal of a motor in a printer is important.

SUMMARY

A machine with a holder for mounting a motor to the device, which may be a printer, includes a support structure, a motor including a drive shaft with a drive shaft axis aligned with an opening in the support structure, and a holder including a base portion positioned adjacent to the motor, a first spring tab integrally formed with the base portion and operably contacting the motor to bias the motor toward the support structure, and a first latch arm integrally formed with the base portion and coupled with the support structure, the first latch arm resiliently deformed by the support structure in a direction away from the drive shaft axis.

In accordance with another embodiment, a motor holder includes a base including a motor facing side, a first latch arm integrally formed with the base and extending away from a first portion of the base along a longitudinal axis of the motor holder, a second latch arm integrally formed with the base and extending away from a second portion of the base, the second latch arm spaced apart from the first latch arm, a first hook portion integrally formed with the first latch arm and extending from the first latch arm in a direction toward the base and toward the second latch arm, a second hook portion integrally formed with the second latch arm and extending from the second latch arm in a direction toward the base and toward the first latch arm, and a first biasing member integrally formed with the base, the first biasing member resiliently extending from the base in a direction generally toward the first hook portion.

In a further embodiment, a machine includes a motor including a drive shaft extending along a drive shaft axis, the motor having a first height from an upper surface to a lower surface along the drive shaft axis, a support structure (i) defining an opening aligned with the drive shaft axis, and (ii) having a second height from an outer side to an inner side along the drive shaft axis, and a holder including a base portion a first spring tab integrally formed with the base portion and having a maximum spring travel distance along the drive shaft axis from a fully released position to a fully compressed position, at least one latch arm integrally formed with the base portion, and a hook portion integrally formed with the at least one latch arm and extending from the first latch arm in a direction upwardly toward the base, the hook portion defining a clearance height along the drive shaft axis between the hook portion and the fully released position of the first spring tab, wherein the sum of the first height and the second height is (i) greater than the clearance height, and (ii) less than the sum of the clearance height and the maximum spring travel.

DESCRIPTION

Figure 1:
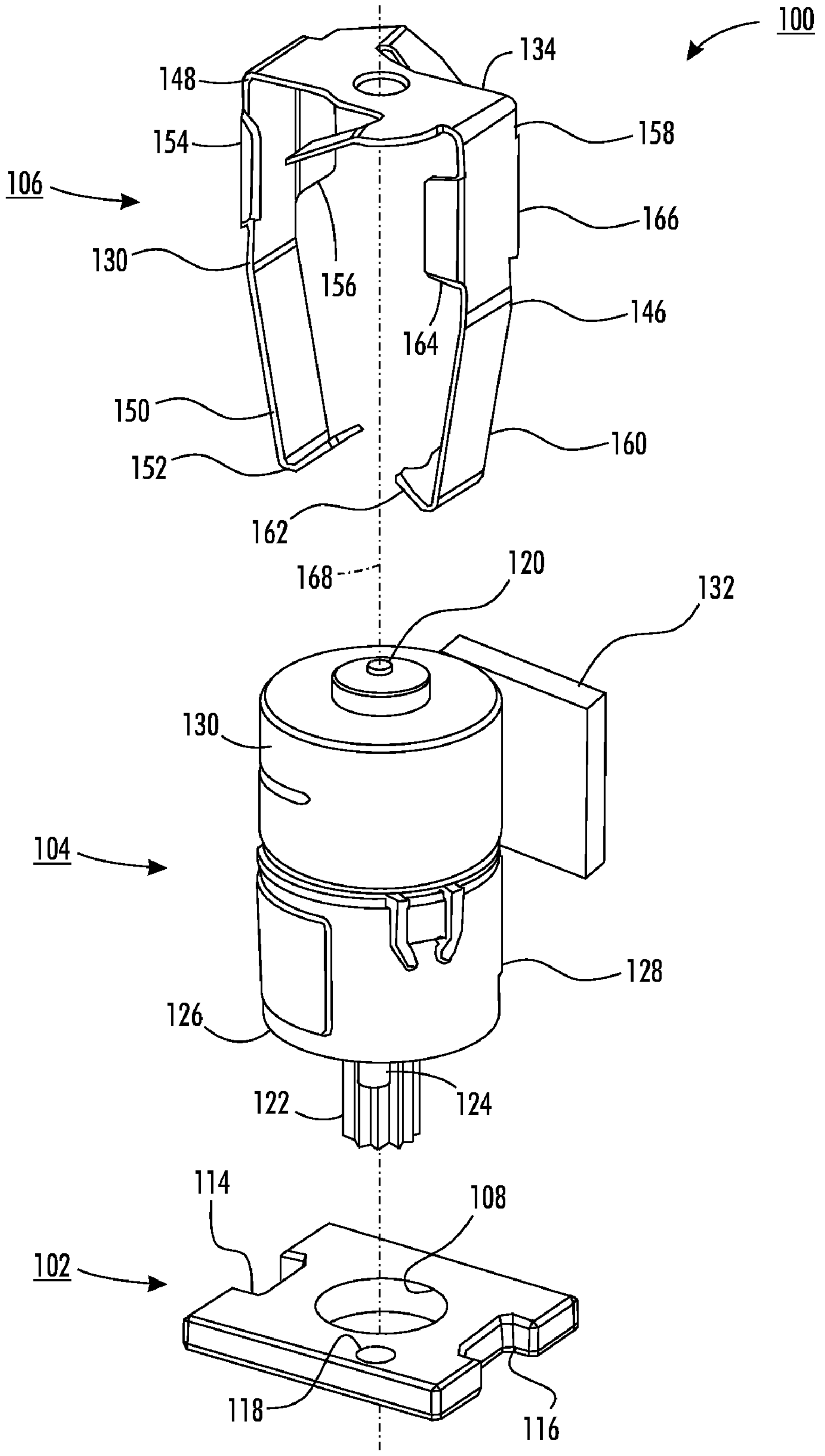
FIG. 1 depicts an exploded view of a motor support system including a holder, a motor, and a support surface.
Figure 2:
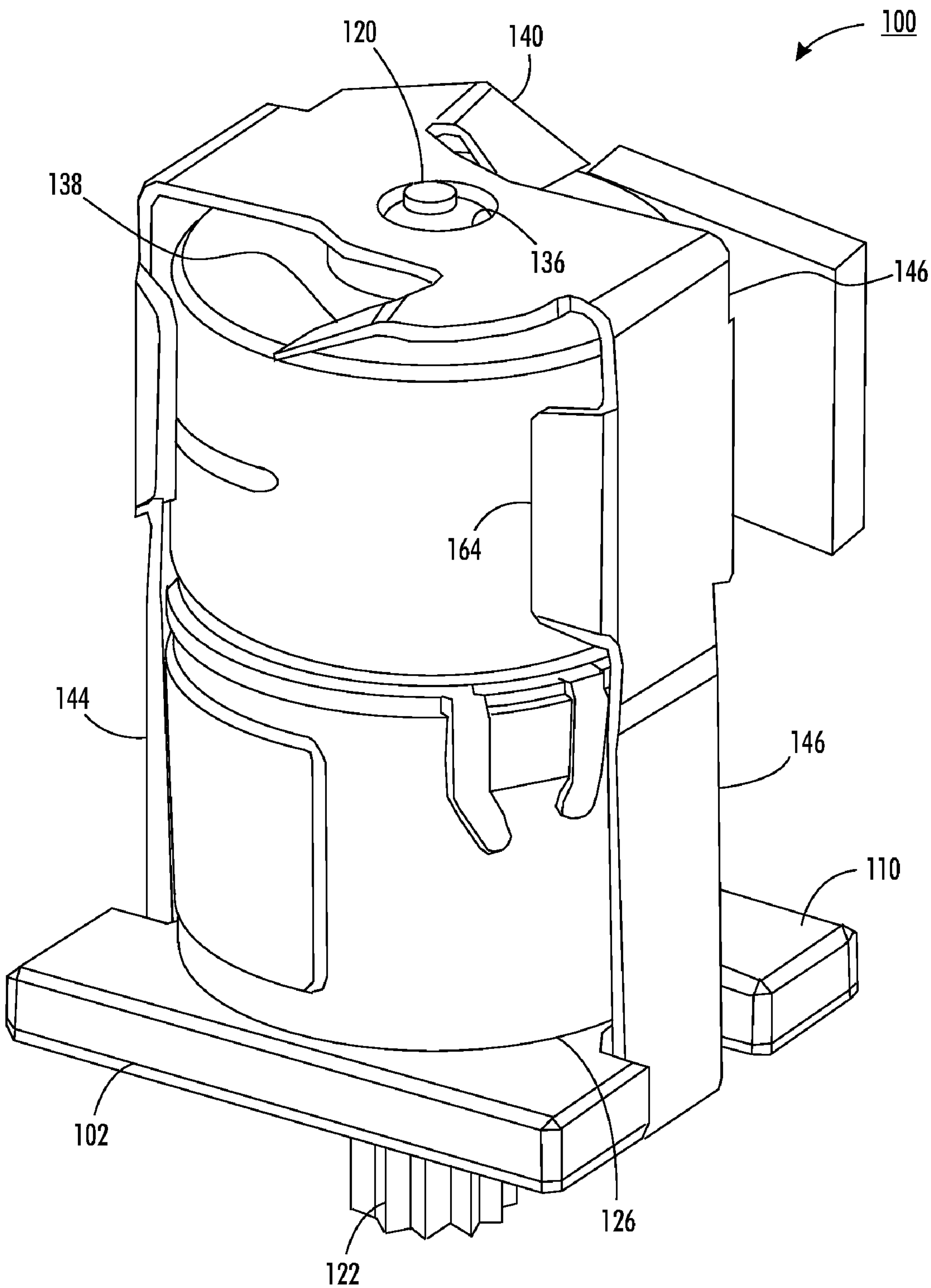
FIG. 2 depicts a top perspective view of the motor support system of FIG. 1.
Figure 3:
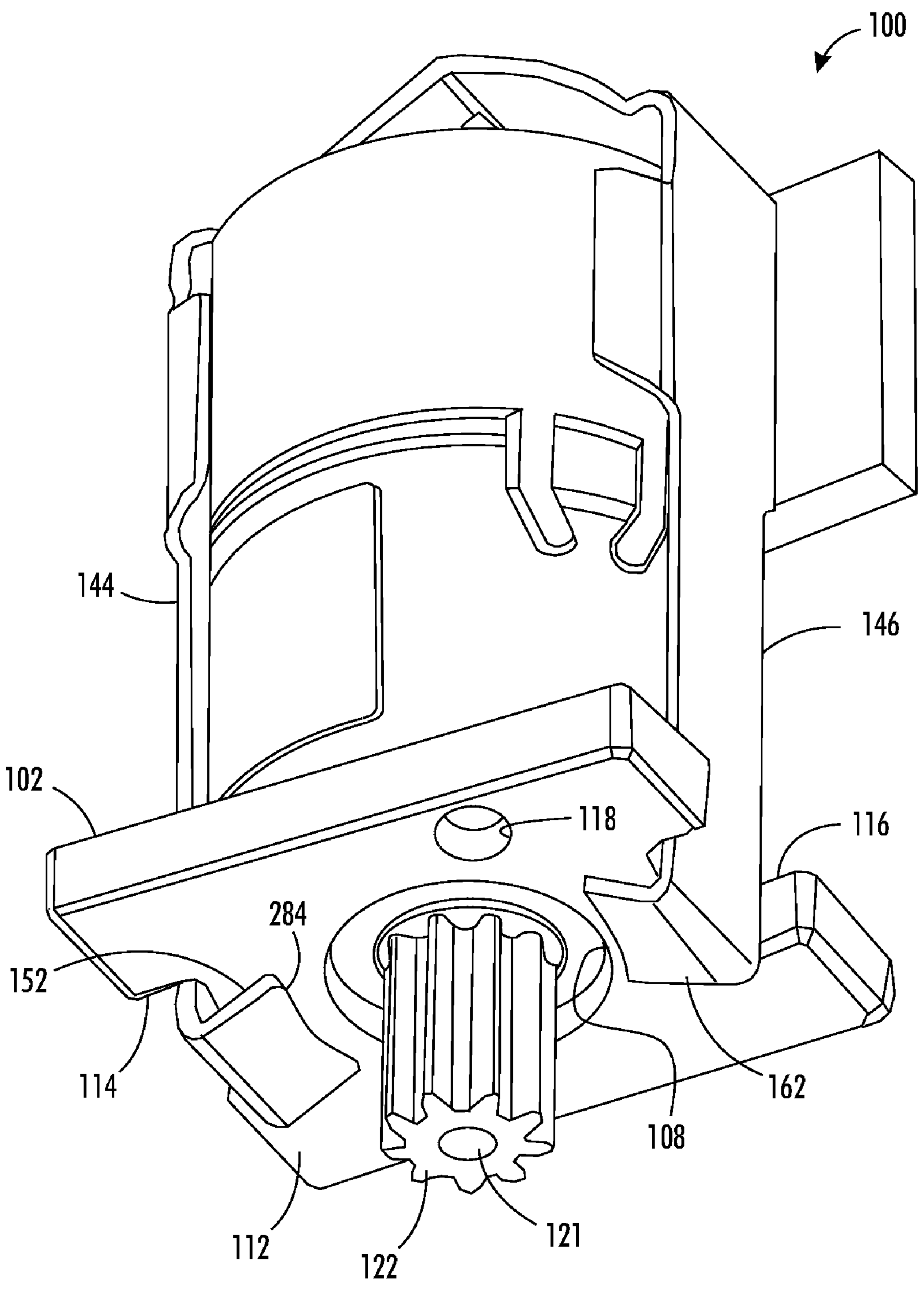
FIG. 3 depicts a bottom perspective view of the motor support system of FIG. 1.

With initial reference to FIGS. 1-3, a motor support system 100 includes a support structure 102, a motor unit 104 and a holder 106. The support structure 102 may be specifically provided as a structure for mounting of the motor unit 104. Alternatively, the support structure 102 may be, for example, a printer chassis or housing which provides structural support for a number of different components within the printer or other motorized device.

The support structure 102 includes a central opening 108 which extends from an outer side 110 of the support structure 102 to an inner side 112 of the support structure 102. Two notches 114 and 116 are positioned on opposite sides of the central opening 108 and extend from the outer side 110 to the inner side 112. An alignment bore 118 is also included in the support structure 102.

The motor unit 104 includes a motor drive shaft 120 which drives an output drive shaft 121 on which a gear 122 is mounted through a gear box 128. An alignment pin 124 extends from the end 126 of the gear box 128. The motor drive shaft 120 is exposed through an upper motor housing 130. A power and control module 132 extends outwardly from the upper motor housing 130. The power and control module 132 provides connections for providing power and control signals to the motor unit 104.

Figure 4:
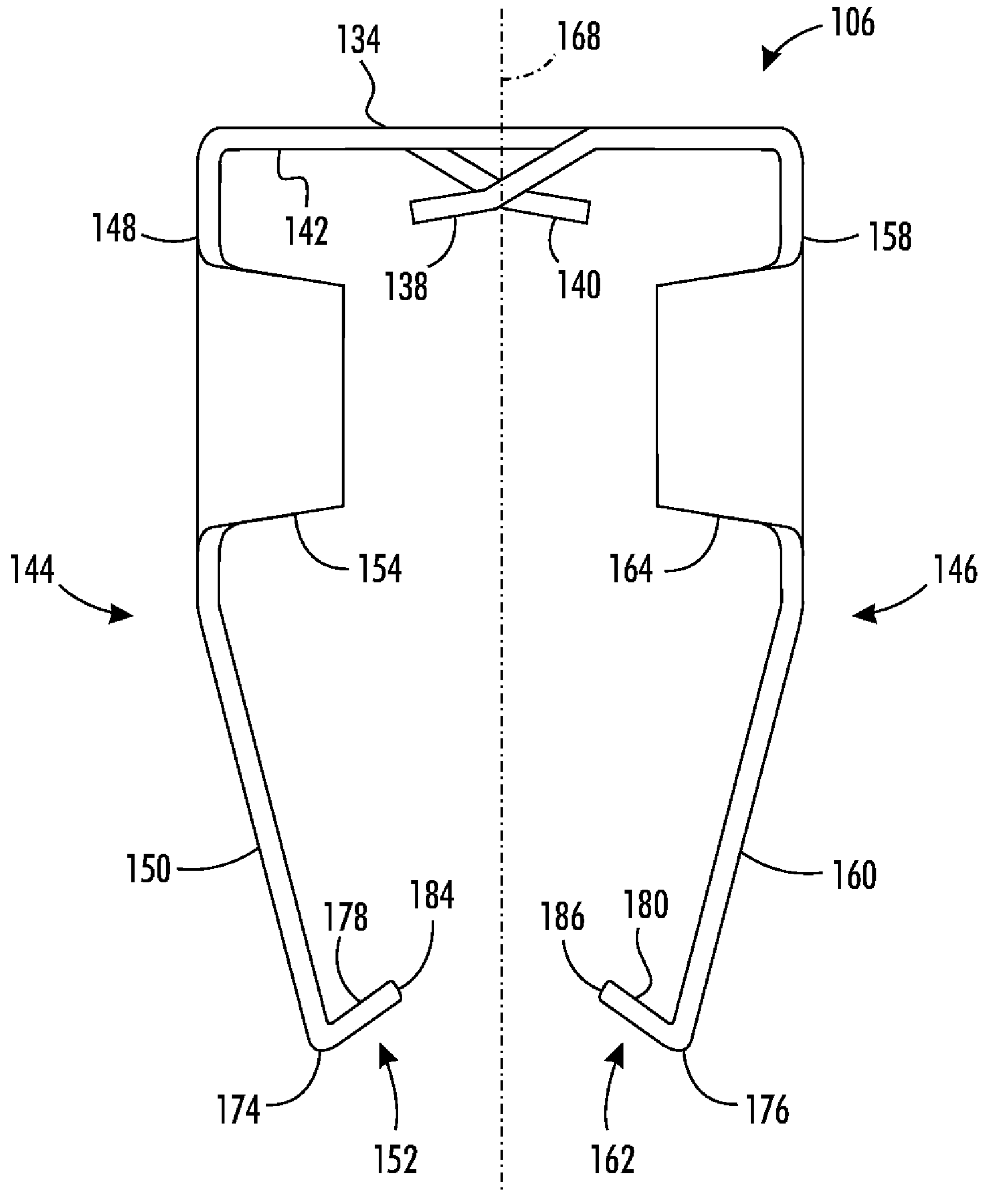
FIG. 4 depicts a side plan view of the holder of FIG. 1.

The holder 106, also shown in FIG. 4, includes a base portion 134 with a clearance bore 136. Two spring tabs 138 and 140 extend downwardly from a motor facing side 142 of the base portion 134. The holder 106 further includes two latch arms 144 and 146. The latch arm 144 includes an upper arm portion 148, a lower arm portion 150, and a hook portion 152. Two alignment tabs 154 and 156 extend from the upper arm portion 148 generally toward the latch arm 146. The alignment tabs 154 and 156, in addition to other functions, provide increase stiffness for the latch arm 146. The latch arm 146 also includes an upper arm portion 158, a lower arm portion 160, a hook portion 162, and two alignment tabs 164 and 166.

The upper arm portions 148 and 158 are spaced apart at a distance that is slightly larger than the diameter of the motor unit 104, and the lower arm portions 150 and 160 are angled inwardly from the upper arm portions 148 and 158 toward the longitudinal axis 168 of the holder 106. The alignment tabs 154, 156, 164, and 166 extend from the respective latch arm 144/146 at an angle such that the alignment tabs 154 and 166 are spaced apart by a distance that is substantially equal to or slightly less than the diameter of the motor unit 104. Likewise, the alignment tabs 156 and 164 are spaced apart by a distance that is substantially equal to or slightly less than the diameter of the motor unit 104.

The hook portions 152 and 162 extend inwardly toward the longitudinal axis 168 and upwardly toward the base portion 134 from a distal portion 174/176 to a proximal portion 178/180, respectively. The ends 184 and 186 of the proximal portions 178 and 180, in this embodiment, are curved so as to be equidistant from the longitudinal axis 168 when viewed from the base portion 134 as depicted most clearly in FIG. 3.

The motor support system 100 is assembled by positioning the hook portions 152 and 162 on opposite sides of the motor unit 104 and moving the holder 106 towards the motor unit 104. The distance between the ends 184 and 186 is preferably selected to be less than the diameter of the motor unit 104. Accordingly, as the holder 106 is moved toward the motor unit 104, the hook portions 152 and 162 contact the upper motor housing 130. Because the hook portions 152 and 162 are angled inwardly and upwardly from the lower arm portions 150 and 160, respectively, continued movement of the holder 106 toward the motor unit 104 forces the lower arm portions 150 and 160 away from the longitudinal axis 168. Application of force directly in line with the longitudinal axis 168 results in automatic alignment of the axis of the output drive shaft 121 with the longitudinal axis 168 so long as the spring constants of the latch arms 140 and 142 are matched.

As the base 134 of the holder 106 moves further toward the motor unit 104, the alignment tabs 154, 156, 164, and 166 contact the upper housing 130 and the upper arm portions 148 and 158 are biased in a direction away from the longitudinal axis 168. The outward flexure of the upper arm portions 148 and 158 is less than the outward flexure of the lower arm portions 150 and 160 as the hook portions 152 and 162 were moved against the upper housing 130. Accordingly, the hook portions 152 and 162 remain in contact with the gear box 128 when the alignment tabs 154, 156, 164, and 166 contact the upper housing 130.

Once the alignment tabs 154, 156, 164, and 166 contact the upper housing 130, the holder 106 is rotated about the longitudinal axis 168 until the alignment tab 166 contacts the power and control module 132. The holder 106 is now in a predetermined rotational relationship with the motor unit 104 about the longitudinal axis 168. If desired, one or more other structures may be provided to interact with one or more of the alignment tabs 154, 156, 164, and 166 to rotationally align the holder 106 with the motor unit 104.

Continued movement of the holder 106 toward the motor unit 104 causes the spring tabs 138 and 140, initially in a fully released position, to contact the upper motor housing 130. Preferably, the spring tabs 138 and 140 contact the upper motor housing 130 before the ends 184 and 186 move beyond the end 126 of the gear box 128.

In other words, the distance between the ends 184 and 186 and the spring tabs 138 and 140 along the longitudinal axis 168, when the spring tabs 138 and 140 are not compressed, is less than the height of the motor unit 104. Thus, continued movement of the holder 106 toward the motor unit 104 causes the spring tabs 138 and 140 to be compressed toward the base portion 134. Thereafter, the ends 184 and 186 move beyond the end 126 of the gearbox 128.

Once the ends 184 and 186 move beyond the end 126 of the gear box 128, the resilient characteristic of the latch arms 144 and 146 causes movement of the hook portions 152 and 162 toward the longitudinal axis 168 until the lower portions 150 and 160 of the latch arms 144 and 146, respectively, contact the gear box 128. The ends 184 and 186 are curved about the longitudinal axis 168 to provide clearance between the ends 184 and 186 and the gear 122.

Axial pressure against the base 134 may now be released allowing the spring tabs 138 and 140 to force the base 134 in a direction away from the motor unit 104. The bias from the spring tabs 138 and 140 bring the ends 184 and 186 into contact with the end 126 of the gearbox 128.

At this point in the assembly process, the spring tabs 138 and 140 thus exert an axial bias on the motor unit 104 toward the hook portions 152 and 160 along the longitudinal axis 168 while the latch arms 144 and 146 and the alignment tabs 154, 156, 164, and 166 each exert a cross-axis force on the motor unit 104. Thus, the motor unit 104 is clamped within the holder 106 both axially and radially. Additionally, the motor unit 104 is radially aligned within the holder 106 by positioning of the alignment tab 166 against the power and control module 132.

An operator may now move the clamped motor unit 104 and holder 106 toward the support structure 102 with a single hand. The operator aligns the gear 122 with the central opening 108 and the clamped motor unit 104 and holder 106 are moved toward the support structure 102. The operator then aligns the hook portions 152 and 162 with the notches 114 and 116. Once the hook portions 152 and 162 are aligned with the notches 114 and 116, respectively, the alignment pin 124 will be aligned with the alignment bore 118. In the event the hook portions 152 and 162 are aligned with the notches 116 and 114, respectively, the operator rotates the clamped motor unit 104 and holder 106 to align the alignment pin 124 with the alignment bore 118.

The operator then moves the clamped motor unit 104 and holder 106 toward the support structure 102 and the gear 122 enters the central opening 108. Then, the hook portions 152 and 162 contact the support structure 102. In one embodiment, the greatest distance between the distal portions 174 and 176 is greater than the distance between the notches 114 and 116. Accordingly, the hook portions 152 and 162 contact the support structure 102. Because the hook portions 152 and 162 are angled inwardly and upwardly from the lower arm portions 150 and 160, respectively, continued movement of the holder 106 and the motor unit 104 along the longitudinal axis 168 forces the lower arm portions 150 and 160 away from the longitudinal axis 168. Application of force directly in line with the longitudinal axis 168 results in automatic alignment of the alignment pin 124 with the alignment bore 118 and the gear 122 within the central opening 108 so long as the spring constants of the latch arms 140 and 142 are matched.

As the ends 184 and 186 are forced outwardly away from the longitudinal axis 168, the alignment pin 124 enters the alignment bore 118. Continued movement of the motor unit 104 and the holder 106 along the longitudinal axis 168 continues to force the ends 184 and 186 outwardly to a location immediately above the notches 114 and 116, respectively. At this point, the end 126 of the gear box 128 abuts the outer side 110 of the support structure 102.

Continued movement of the motor unit 104 and the holder 106 forces the spring tabs 138 and 140 into further compression, allowing the ends 184 and 186 to move along the walls of the notches 114 and 116 toward the inner side 112 of the support structure 102. The travel of the spring tabs 138 and 140, which is the distance along the longitudinal axis 168 of the spring tabs 138 and 140 from a fully released position to a fully compressed position, is selected such that the ends 184 and 186 of the hook portions 152 and 162 move out of the notches 114 and 116 prior to the spring tabs 138 and 140 being fully compressed. Additionally, the clearance bore 136 ensures that the protruding portion of the motor drive shaft 120 does not contact the base portion 134 prior to the spring tabs 138 and 140 being fully compressed.

Accordingly, movement of the motor unit 104 and the holder 106 along the longitudinal axis 168 in the direction toward the outer side 110 of the support structure 102 causes the hook portions 152 and 162 to move out of the notches 114 and 116. Once the hook portions 152 and 162 move out of the notches 114 and 116, the resilient characteristic of the latch arms 144 and 146 forces the lower arm portions 150 and 160 of the latch arms 144 and 146, respectively, to move toward the longitudinal axis 168 until the lower arm portions 150 and 160 contact the walls of the notches 114 and 116. Pressure applied by the operator to the base 134 is then relaxed, and the spring tabs 138 and 140 bias the holder 106 away from the support structure 102 until the ends 184 and 186 of the hook portions 152 and 162, respectively, are brought into firm contact with the inner side 112 as shown in FIGS. 2, 3, and 5.

Figure 5:
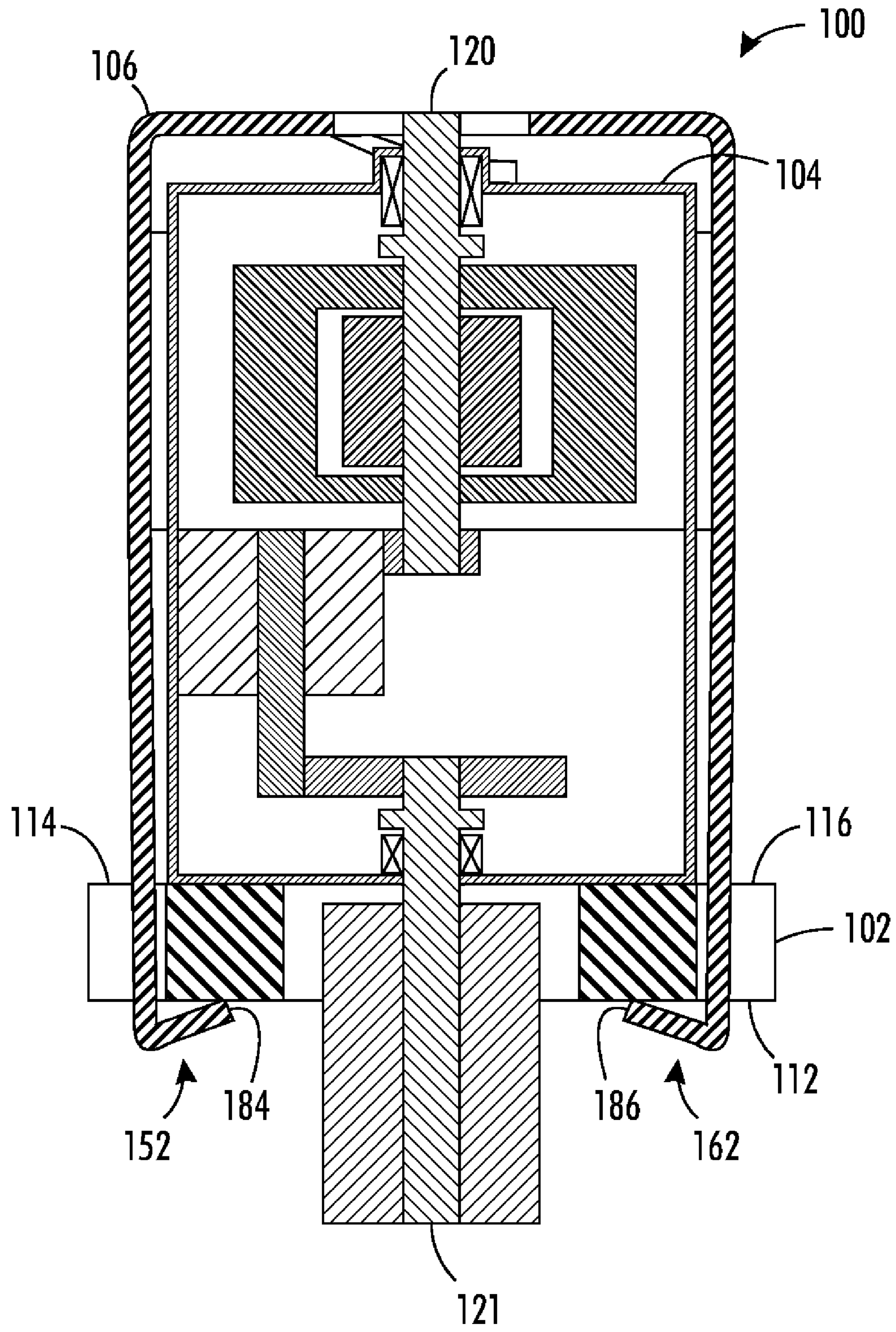
FIG. 5 depicts a side cross-sectional view of the motor support system of FIG. 1.

In FIGS. 2, 3, and 5, the spring tabs 138 and 140 exert an axial bias on the motor unit 104 toward the hook portions 152 and 162 along the longitudinal axis 168. Accordingly, the end 126 of the motor unit 104 is forced against the outer side 110 of the support structure. Thus, the motor unit 104 and the support surface 102 are axially clamped between the ends 184 and 186 of the hook portions 152 and 162.

Additionally, the alignment tabs 154, 156, 164, and 166 each exert a cross-axis force on the motor unit 104 and the lower arm portions 150 and 160 exert a cross-axis force on the support structure 102. Thus the motor unit 104 and the support structure 102 are clamped in cross-axis directions. Furthermore, the positioning of the alignment pin 124 within the alignment bore 118 inhibits any rotation of the motor unit 104 with respect to the support structure 102.

Thus, the motor support system 100 maintains the output drive shaft 121 of the motor unit 104 aligned axially, radially, and rotationally with respect to the support structure 102. Advantageously, the holder 106 may be integrally formed of sheet spring steel using a progressive die with no post operation fabricating steps required.

Disassembly of the motor support system 100 is accomplished essentially by reversal of the foregoing process. During removal, however, the biasing force of the latch arms 144 and 146 toward the longitudinal axis 168 must be overcome to remove the holder 106 from the support structure 102 and to remove the motor unit 104 from the holder 106.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art, which are also intended to be encompassed by the following claims.

What is claimed is:

1. A motor holder comprising:
- a support structure;
- a motor including a drive shaft with a drive shaft axis aligned with an opening in the support structure and a motor housing with a motor housing diameter orthogonal to the drive axis; and
- a holder including
  - a base portion positioned adjacent to the motor, a first spring tab integrally formed with the base portion and operably contacting the motor to bias the motor toward the support structure, and
  - a first latch arm integrally formed with the base portion and coupled with the support structure, the first latch arm resiliently deformed by the support structure in a direction away from the drive shaft axis and the first latch arm having a first upper latch arm portion;
  - a second latch arm integrally formed with the base portion and coupled with the support structure, the second latch arm resiliently deformed by the support structure and the second latch arm having a second upper latch arm portion, the second upper latch arm portion being spaced apart from the first upper latch arm portion by a distance substantially equal to the motor housing diameter;
  - a first tab extending from the first alignment upper latch arm portion; and
  - a second tab extending from the second alignment upper latch arm portion, wherein a portion of the first tab is spaced apart from a portion of the second tab by a distance, measured through a longitudinal axis of the holder when the motor is not positioned within the holder, that is less than the motor housing diameter.

2. The motor holder of claim 1 further comprising:
- a third alignment tab extending from the first latch arm.

3. A motor holder comprising:
- a support structure;
- a motor including a drive shaft with a drive shaft axis aligned with an opening in the support structure; and a holder including a base portion positioned adjacent to the motor, a first spring tab integrally formed with the base portion and operably contacting the motor to bias the motor toward the support structure, a first latch arm integrally formed with the base portion and coupled with the support structure, the first latch arm resiliently deformed by the support structure in a direction away from the drive shaft axis; and a hook portion integrally formed with a lower portion of the first latch arm and extending toward the base portion from the lower portion of the first latch arm, the hook portion comprises: a distal end portion proximate to the lower portion of the first latch arm, and a proximal end periphery spaced apart from the lower portion of the first latch arm, the proximal end periphery being curved with respect to the lower portion of the first latch arm to position the proximal end periphery in a plane that intersects the drive shaft axis at a non-perpendicular angle.

4. The motor holder of claim 3, the motor further comprising:

a motor housing with a motor housing diameter orthogonal to the drive shaft axis; and the support structure defines a notch spaced apart from the drive shaft axis by a distance of about one-half of the motor housing diameter, the notch shaped to receive a portion of the first latch arm therein.

5. The motor holder of claim 4, wherein:

the motor defines a first height along the drive shaft axis;

the support structure defines a second height along the drive shaft axis;

the first spring tab defines a maximum spring travel distance along the drive shaft axis from a fully released position to a fully compressed position;

the hook portion defines a clearance height along the drive shaft axis between the hook portion and the fully released position of the first spring tab; and the sum of the first height and the second height is (i) greater than the clearance height, and (ii) less than the sum of the clearance height and the maximum spring travel distance.

6. A motor holder comprising:

a base including a motor facing side;

a first latch arm integrally formed with the base and extending away from a first portion of the base along a longitudinal axis of the motor holder, the first latch arm includes a first upper portion generally parallel to the longitudinal axis and a first lower portion extending from the first upper portion downwardly and inwardly toward the longitudinal axis;

a second latch arm integrally formed with the base and extending away from a second portion of the base, the second latch arm spaced apart from the first latch arm and the second latch arm includes a second upper portion generally parallel to the longitudinal axis and a second lower portion extending from the first upper portion downwardly and inwardly toward the longitudinal axis;

a first hook portion integrally formed with the first latch arm and extending from the first latch arm in a direction toward the base and toward the second latch arm;

a second hook portion integrally formed with the second latch arm and extending from the second latch arm in a direction toward the base and toward the first latch arm; and a first biasing member integrally formed with the base, the first biasing member resiliently extending from the base in a direction generally toward the first hook portion.

7. The motor holder of claim 6 further comprising:

at least one first alignment tab extending from the first latch arm to a location closer to the longitudinal axis than the location of the first upper portion; and at least one second alignment tab extending from the second latch arm to a location closer to the longitudinal axis than the location of the second upper portion.

8. The motor holder of claim 6, wherein the first hook portion extends from a distal end portion integrally formed with the first lower portion to a proximal end periphery spaced apart from the first lower portion, the proximal end periphery being curved with respect to the first lower portion of the first latch arm to position the proximal end periphery in a plane that intersects the longitudinal axis at a non-perpendicular angle.

* * * * *